US010599762B1

(12) United States Patent
Alexandrescu et al.

(10) Patent No.: US 10,599,762 B1
(45) Date of Patent: Mar. 24, 2020

(54) SYSTEMS AND METHODS FOR CREATING A DYNAMIC ELECTRONIC FORM

(71) Applicant: Palantir Technologies Inc., Palo Alto, CA (US)

(72) Inventors: Andrei Alexandrescu, London (GB); Alexandru-Viorel Antihi, Palo Alto, CA (US); Bryan Williams, New York, NY (US); Cenk Sezgin, London (GB); Geoffrey Bakker, Washington, DC (US); Kunal Marwaha, Washington, DC (US); Michal Adamczyk, New York, NY (US); Matthew Fedderly, Baltimore, MD (US); Takashi Okamoto, Menlo Park, CA (US); Winnie Chai, Los Altos, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 47 days.

(21) Appl. No.: 15/872,699

(22) Filed: Jan. 16, 2018

(51) Int. Cl.
| | | |
|---|---|---|
| *G06F 17/00* | (2019.01) | |
| *G06F 17/24* | (2006.01) | |
| *G06F 17/27* | (2006.01) | |
| G06F 3/0482 | (2013.01) | |
| G06F 16/903 | (2019.01) | |

(52) U.S. Cl.
CPC .......... *G06F 17/243* (2013.01); *G06F 17/248* (2013.01); *G06F 17/276* (2013.01); *G06F 3/0482* (2013.01); *G06F 16/903* (2019.01)

(58) Field of Classification Search
CPC .................................................. G06F 17/243
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |
| 5,428,776 A | 6/1995 | Rothfield |
| 5,542,089 A | 7/1996 | Lindsay et al. |

(Continued)

FOREIGN PATENT DOCUMENTS

| | | |
|---|---|---|
| DE | 102014103482 | 9/2014 |
| EP | 1647908 | 4/2006 |

(Continued)

OTHER PUBLICATIONS

"A Quick Guide to UniProtKB Swiss-Prot & TrEMBL," Sep. 2011, pp. 2.

(Continued)

*Primary Examiner* — Andrew T McIntosh
(74) *Attorney, Agent, or Firm* — Sheppard Mullin Richter & Hampton LLP

(57) ABSTRACT

A system and method for creating a dynamic electronic form are described. The system may include one or more processors that cause the system to perform create an electronic form with one or more data entry fields. The system may also obtain access to a plurality of datasets, where each dataset may include multiple entry fields and integrate at least one identified dataset with the electronic form. The system may further suggest at least one data input in the data entry field based on information input in the data entry field by a user. The data entry input suggested may be sourced from the identified dataset integrated to the electronic form.

16 Claims, 8 Drawing Sheets

(56) References Cited

U.S. PATENT DOCUMENTS

| | | |
|---|---|---|
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0257134 A1* | 11/2005 | Goodman .......... G06F 17/243 715/226 |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0181501 A1* | 7/2008 | Faraboschi .......... G06F 3/03545 382/179 |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |

(56) References Cited

U.S. PATENT DOCUMENTS

| | | | |
|---|---|---|---|
| 2013/0226944 | A1 | 8/2013 | Baid et al. |
| 2013/0232220 | A1 | 9/2013 | Sampson |
| 2014/0012886 | A1 | 1/2014 | Downing et al. |
| 2014/0074888 | A1 | 3/2014 | Potter et al. |
| 2014/0108074 | A1 | 4/2014 | Miller et al. |
| 2014/0115589 | A1 | 4/2014 | Marinelli, III et al. |
| 2014/0115610 | A1 | 4/2014 | Marinelli, III et al. |
| 2014/0214579 | A1 | 7/2014 | Shen et al. |
| 2014/0244388 | A1 | 8/2014 | Manouchehri et al. |
| 2015/0032478 | A1* | 1/2015 | Humpherys ........... G06Q 40/08 705/4 |
| 2015/0112641 | A1 | 4/2015 | Faraj |
| 2015/0269030 | A1 | 9/2015 | Fisher et al. |
| 2016/0026923 | A1 | 1/2016 | Erenrich et al. |

FOREIGN PATENT DOCUMENTS

| | | |
|---|---|---|
| EP | 2 634 745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

"A Tour of Pinboard," <http://pinboard.in/tour> as printed May 15, 2014 in 6 pages.

"The FASTA Program Package," fasta-36.3.4, Mar. 25, 2011, pp. 29.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb/843147 printed Dec. 18, 2006 in 5 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, (Oct. 10, 1994) pp. 341-354.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Goldstein et al., "Stacks Lazy Threads: Implementing a Fast Parallel Call," Journal of Parallel and Distributed Computing, Jan. 1, 1996, pp. 5-20.

Han et al., "Efficient Computation of Iceberg Cubes with Complex Measures," ACM Sigmod, May 21-24, 2001, pp. 1-12.

Ivanova et al., "An Architecture for Recycling Intermediates in a Column-Store," Proceedings of the 35th Sigmod International Conference on Management of Data, Sigmod '09, Jun. 29, 2009, p. 309.

Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Karp et al., "A Simple Algorithm for Finding Frequent Elements in Streams and Bags," ACM Transactions on Database Systems, vol. 28, No. 1, Mar. 2003, pp. 51Đ55.

Kitts, Paul, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

Madden, Tom, "Chapter 16: The BLAST Sequence Analysis Tool," The NCBI Handbook, Oct. 2002, pp. 1-15.

Mendes et al., "TcruziKB: Enabling Complex Queries for Genomic Data Exploration," IEEE International Conference on Semantic Computing, Aug. 2008, pp. 432-439.

Mizrachi, Ilene, "Chapter 1: Gen Bank: The Nuckeotide Sequence Database," The NCBI Handbook, Oct. 2002, pp. 1-14.

Russell et al., "NITELIGHT: A Graphical Tool for Semantic Query Construction," 2008, pp. 10.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Smart et al., "A Visual Approach to Semantic Query Design Using a Web-Based Graphical Query Designer," 16th International Conference on Knowledge Engineering and Knowledge Management (EKAW 2008),ÈAcitrezza, Catania, Italy, Sep. 29-Oct. 3, 2008, pp. 16.

Stamos et al., "Remote Evaluation," Journal ACM Transactions on Programming Languages and Systems (TOPLAS) vol. 12, Issue 4, Oct. 1990, pp. 537-564.

Wikipedia, "Machine Code", p. 1-5, printed Aug. 11, 2014.

Wollrath et al., "A Distributed Object Model for the Java System," Proceedings of the 2nd Conference on USENEX, Conference on Object-Oriented Technologies (COOTS), Jun. 17, 1996, pp. 219-231.

\* cited by examiner

| | Part No. Interger | Part Name String | Factory for Part String | Replacement Part String | Primary Items with Parts String |
|---|---|---|---|---|---|
| 100 | 100 | PW34 | California | XP4 | Chair, Table, Bed |
| 101 | 101 | XP4 | North Carolina | SD234 | Table |
| 102 | 102 | V07 | Virginia | PW34 | Sofa |
| 103 | 103 | XL734 | North Carolina | V07 | Chair, Sofa |
| 104 | 104 | SD234 | North Carolina | SD234 | Lamp |
| 105 | 105 | DFS43 | California | XP4 | Table |
| 106 | 106 | QEG434 | Washington | SDF23 | Lamp |
| 107 | 107 | SDK098234 | Idaho | X4 | Door |
| 108 | 108 | SDF234 | Washington | QDG34 | Bed, Table |
| 109 | 109 | OSC212 | Washington | XP4 | Table |
| 110 | 110 | V123 | California | WE34 | Lamp |
| 111 | 111 | QDG34 | Virginia | V123 | Lamp |
| 112 | 112 | WER23 | Virginia | WER | Chair, Table |

☐ Create In-Take Form

In-Take Form

USER ID

Part Name: PW34

Problem: Supply Issue

Primary Items: Please Select Value / Chair / Table

Gross Cost

Gross IDR

Efficiency: ○Yes ○No

Completed

Cancel　　　　　　　　　　　　　　　　Save

Edit form

SYSTEMS AND METHODS FOR CREATING A DYNAMIC ELECTRONIC FORM

TECHNICAL FIELD

This disclosure relates to approaches for creating a dynamic electronic form in response to the data captured in the data entry fields.

BACKGROUND

Electronic forms for inputting and collecting data are used to obtain information from users. However, conventional electronic forms are often static and require users to input data based on his or her own knowledge and memory alone. As such, conventional approaches may limit the accuracy of the collected data input in the electronic forms. Furthermore, often a single standardized electronic form is used to accommodate various data intake purposes, which may result in redundant and/or unnecessary questions. As a result, conventional approaches may lead to inefficient data intake processes and/or collection of incorrect information.

SUMMARY

Described herein are systems and methods for creating a dynamic electronic form. In one embodiment, the disclosure describes systems and methods for creating a dynamic electronic form.

In some embodiments, the system may include one or more processors and a memory storing instructions that, when executed by the one or more processors, cause the system to perform at least create an electronic form with one or more data entry fields. The processors may further obtain access to a plurality of datasets, where each dataset includes multiple entry fields and integrate at least one identified dataset with the electronic form. The processor may further suggest at least one data entry input in the data entry field based on information input in the data entry field by a user, such that the data entry input suggested is sourced from the identified dataset integrated to the electronic form.

In further embodiments, the electronic form may create if-then structure to select data entry fields. The if-then structure may cause a change in a hierarchy listing of a plurality of data entry fields in response to at least one data entry input in the data entry fields.

In some instances, the system may further include one or more processors cause the system to perform import at least one data item listed in the entry field of the dataset to the corresponding data entry field.

In other instances, the system may also include one or more processors to determine a relationship between information input in the data entry field by a user and the entry fields in the dataset integrated to the electronic form. By way of example, determining the relationship between information input in the data entry field by the user and the corresponding dataset integrated to the electronic form may include identifying correlation of information amongst rows and columns in the dataset integrated to the electronic form. Additionally, the one or more processors may cause the system to display the suggested data entry input in a pull-down window in the data entry field.

In some embodiments, the one or more processors cause the system to notify incorrect data input by the user in the data entry field when the data input is not located in the dataset integrated to the electronic form.

Embodiments also include a method for creating a dynamic electronic form. The method may include creating an electronic form with one or more data entry fields and obtaining access to a plurality of datasets, each dataset including multiple entry fields. The method may further include integrating at least one identified dataset with the electronic form and suggesting at least one data entry input in the data entry field based on information input in the data entry field by a user. The data entry input suggested may be sourced from the identified dataset integrated to the electronic form.

In some embodiments, creating an electronic form with one or more data entry fields includes implementing if-then structure to select data entry fields. Additionally, if-then structure may cause a change in a hierarchy listing of a plurality of data entry fields in response to at least one data entry input in the data entry fields.

In some instances, the method may also include importing at least one data item listed in the entry field of the dataset to the corresponding data entry field. Furthermore, suggesting at least one data entry input in the data entry field may include determining a relationship between information input in the data entry field by a user and the corresponding dataset integrated to the electronic form. Determining the relationship between information input in the data entry field by the user and the corresponding dataset integrated to the electronic form may further include identifying correlation of information amongst rows and columns in the dataset integrated to the electronic form.

In some instances, the method may include notifying an incorrect data input by the user in the data entry field when the data input is not located in any one of the datasets integrated to the electronic form. Additionally, the method may further include displaying the suggested data entry input in a pull-down window in the data entry field.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3 depicts an exemplary screen capture of a table of datasets stored in a database in accordance with various embodiments.

FIG. 4 depicts an exemplary screen capture of a dynamic electronic form in accordance with various embodiments.

FIG. 5A depicts an exemplary screen capture of a dynamic electronic form in accordance with various embodiments.

FIG. 5B depicts an exemplary screen capture of a dynamic electronic form with changing data entry fields in accordance with various embodiments.

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

A claimed solution rooted in computer technology overcomes problems specifically arising in the realm of computer technology. In various implementations, an interface for creating a dynamic electronic form is provided in response to receiving data entry items provided by a person filling out the electronic form. The electronic form may change its layout and subsequent data questionnaire based on the information input by the person filling out the electronic form. The electronic form may also provide suggested answers for the data entry field based on the information provided in the data entry field. The dynamic electronic form may be coupled to a database such that the suggested data entry fields are based on the relationship and/or association of the data provided in the data entry fields and a dataset in the database.

Figure 1:
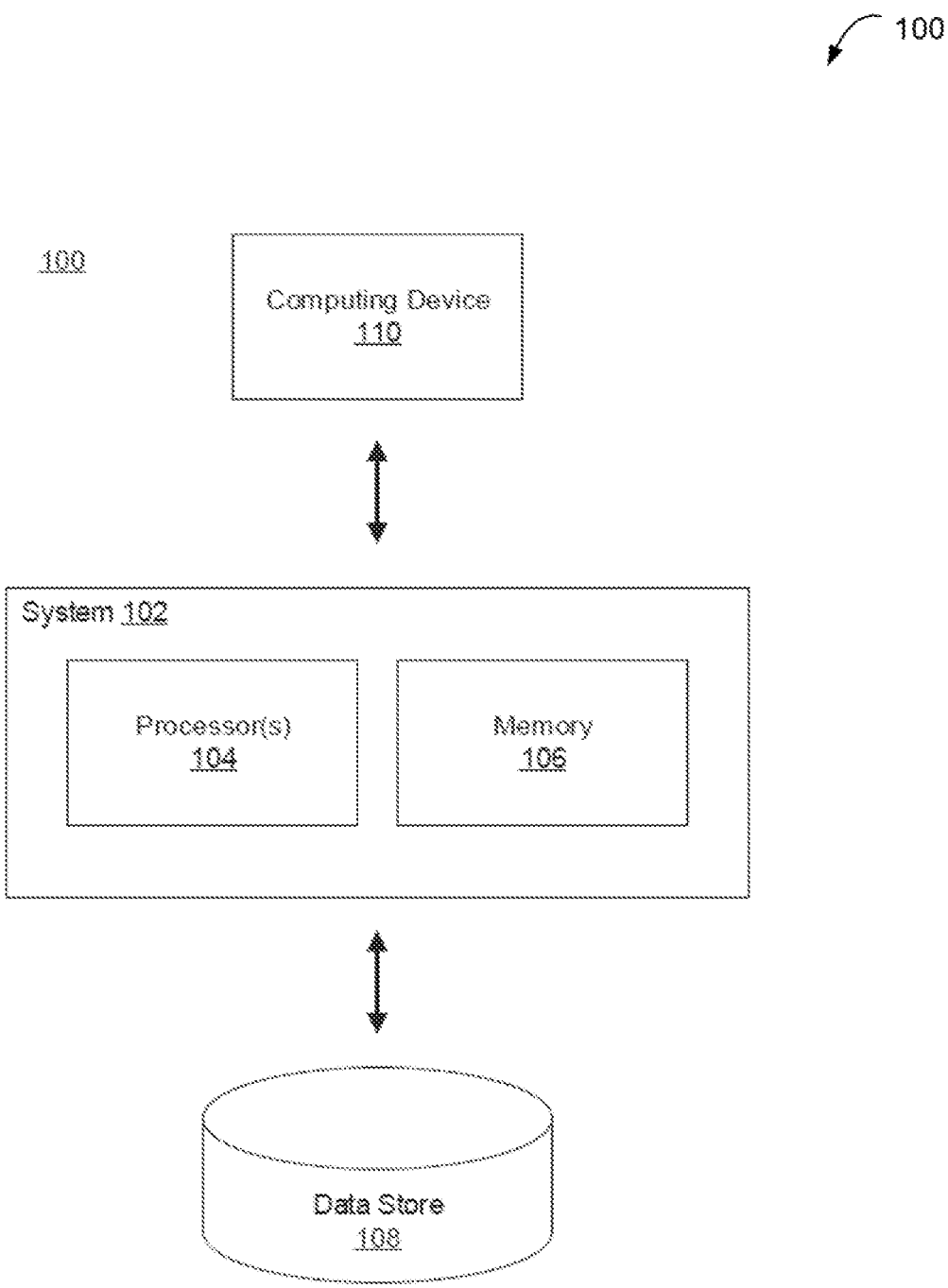
FIG. 1 depicts a diagram of an example environment for generating a dynamic electronic form in accordance with various embodiments.

FIG. 1 depicts a diagram of an example environment 100 for generating a dynamic electronic form in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The environment 100 may also include a computing device 110 that is able to communicate with the system 102 (e.g., over one or more computer networks) and a data store 108 that is accessible to the system 102. For example, the data store 108 may include one or more searchable databases, each containing one or more searchable datasets containing multiple tables, columns, and/or rows of data entries.

In some embodiments, the system 102 and the computing device 110 may be integrated in a single device or system. Alternatively, the system 102 and the computing device 110 may be individual computing devices. For example, the computing device 110 may be a mobile device and the system 102 may be a computing server. The data store 108 may be accessible to the system 102, for example, through the memory 106, another device coupled to the system 102, cloud-based storage, etc. Various operations that are capable of being performed by the system 102 are described below in reference to FIGS. 2-5B.

Figure 2:
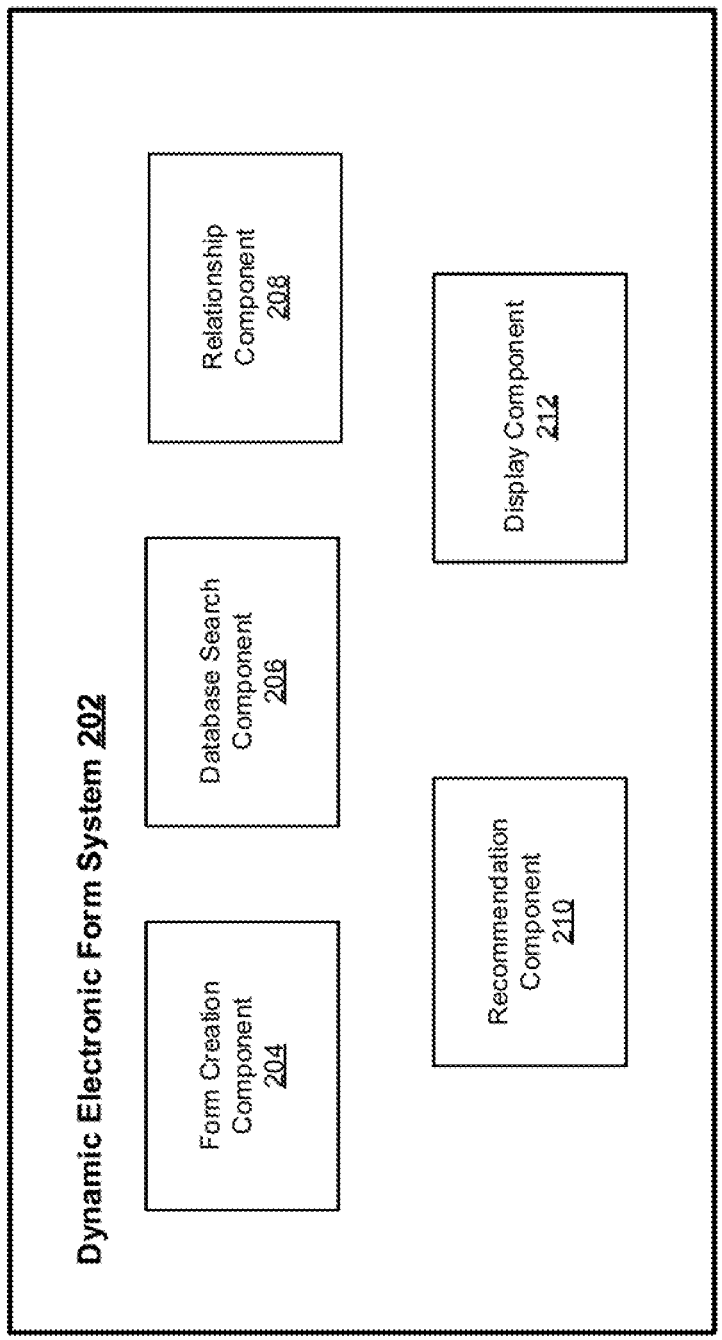
FIG. 2 depicts a diagram of an example of a dynamic form system in accordance with various embodiments

FIG. 2 depicts a diagram 200 of an example of a dynamic electronic form system 202 in accordance with various embodiments. In various embodiments, functionality of the dynamic electronic form system 202 may be performed by one or more servers, workstations, desktop computers, laptop computers, mobile devices, and/or other computing devices. In some embodiments, functionality of the dynamic electronic form system 202 may be performed by computing system 102. For example, the components of the dynamic electronic form system 202 may include a computer-readable instructions executable by processors 104. The components of the dynamic electronic form system 202 may include a form creation component 204, database search component 206, relationship component 208, recommendation component 210, and a display component 212. As used herein, for convenience, the various components of the dynamic electronic form system 202 will be described as performing an operation, when, in fact, the various components comprise instructions which may program the processors 104 (and therefore computing system 102) to perform the operation.

The form creation component 204 may be configured to allow a user to create an electronic form. The form creation component 204 may allow the user to configure the content of the electronic form, such as the type of information or data to be collected from a person filling out the electronic form. Thus, the form creation component 204 may include the exact phrases or questions that are to be displayed on the electronic form next to each data entry field that collects the data input.

The form creation component 204 may also allow the user to select the format of the electronic form and the types of data to be collected. By way of example, the format of the data collection may include a text box, drop-down list box, list box, calendar date selection, check box, button, numbered list, etc. The form creation component 204 may also allow the data entry fields to collect information or data in any of the following formats: string of characters, combination of letters and numbers, letters only, numbers only, etc.

The form creation component 204 may also allow the user to design the visual features of the electronic form and how it is to be displayed on the user interface. For instance, the form creation component 204 may allow the user to choose the font style (e.g., font type, font size, font color, bold/underline/italic options, and the like), background color, location placement of the data entry fields, placement of borders, etc.

In further embodiments, the form creation component 204 may further configure the electronic form to change in response to information or data provided in select data entry fields. This change in the hierarchical structure or listing of the originally displayed data entry fields may change in response to implementing an "if-then" structure to select data entry fields. For example, an electronic form may be created using the form creation component 204 so that if a user selects or inputs "PAINT DAMAGE" in the data entry field, the next data entry field that appears is a selection of paint choice colors. However, if a user changes the data input to "BUMPER DAMAGE" instead of "PAINT DAMAGE" in the data entry field, the subsequent data entry field may be changed so that the data entry field no longer asks or provides a selection of paint choice colors. Instead, the entry field may now request for the vehicle's model and year information. This thus allows for a user to create a dynamic electronic form that changes in response to the data or information provided in the data entry fields.

In some embodiments, the form creation component 204 may be integrated with the data store 108, which may include one or more searchable databases, each containing one or more searchable datasets. In various implementations, database search component 206 may be configured to search across one or more databases to search for dataset entries in the data store 108. This may then allow the electronic forms to import select data from the data store 108.

In further embodiments, the form creation component 204 may integrate select datasets from the data store 108 to a specified electronic form. In some instances, the select datasets from the data store 108 may even be integrated to specific data entry fields. Thus, any input data in the select data entry fields that do not correspond to any of the specified datasets from the data store 108 may be identified as an incorrect data input by the database search component 206.

Additionally, the dynamic electronic form system 202 may further be configured to suggest one or more data input in the data entry field. The relationship component 208 may attempt to provide the person filling out the electronic form with the correct data input entry. In an attempt to provide the correct data input entry, the relationship component 208 may be configured to search across one or more databases to identify all dataset entries that contain a relationship or correlation with the corresponding data input entry.

This may be achieved with the use of the relationship component 208, which may be configured to determine a strength in correlation with the information or data provided in the data entry field and whether it shares any similar properties, describes the same subject, and/or are otherwise related to any datasets in the data store 108. The relationship component 208 may be configured to predict associations between the information or data provided in the data entry field with any one or more data entries in the datasets and/or databases.

The relationship component 208 may calculate a hash value of data in the datasets in the data store 108. In other instances, the relationship component 208 may narrow the calculation of the hash value of the datasets in the data store 108 associated with select data entry fields. Relationship measures may be based on encrypted and/or encoded values of data in a dataset. In such embodiments, the relationship component 208 may be configured to calculate encrypted and/or encoded values corresponding to data in a dataset with specific data entry fields to then provide suggested data entries or answers to that data entry field.

In the instance that the relationship component 208 determines one or more data entries form the datasets in the data store 108 as potential choices for the data entry field, the results for the potential data entry inputs be recommended to the user or person. The recommendation component 210 may then display the results generated from the relationship component 210.

Display component 212 may be configured to generate a visual representation of the dynamic electronic form onto a computing device 110. The display component 212 may also be configured to provide visual indicators such as icons, menus, pull-down windows, buttons, text boxes, selection areas, and/or any relevant graphical user interface elements.

FIG. 3 depicts an exemplary table 300 of datasets stored in a database in accordance with various embodiments. By way of example, the table 300 may include one or more rows 310 with one or more columns 305. It should be noted that there can be any number of rows 310$n$ as well as any number of columns 305$n$ in each of the tables 300 or datasets stored in the data store 108. As a result, each of the datasets may include multiple entry fields.

A row 310 may include data with one or more columns 305$n$. Each column 305$n$ may correspond to a property defined by that dataset. For example, each column may correspond to a property or category of the information stored, such as ID, name, location, and classification information. Furthermore, the database search component 206 may be configured to determine that the correlation of information between the rows 310$n$ and columns 305$n$. For example, search component 206 may be configured to determine that for row 100, part number 100 is identified with the part name PW34, which is produced in a factory in California. Additionally, the search component 206 may further be configured to determine that for part name PW34, the corresponding replacement part is XP4 and that part name PW34 is used in building chairs, tables, and beds. The relationship component 208 may then be able to associate the correlation of information of the rows 310$n$ and columns 305$n$ with a select data entry field.

In various implementations, select datasets such as one or more tables 300 may be integrated to an electronic form created by the form creation component. As a result, the electronic form may be able to extract data from the integrated datasets from the data store 108.

Figure 4:
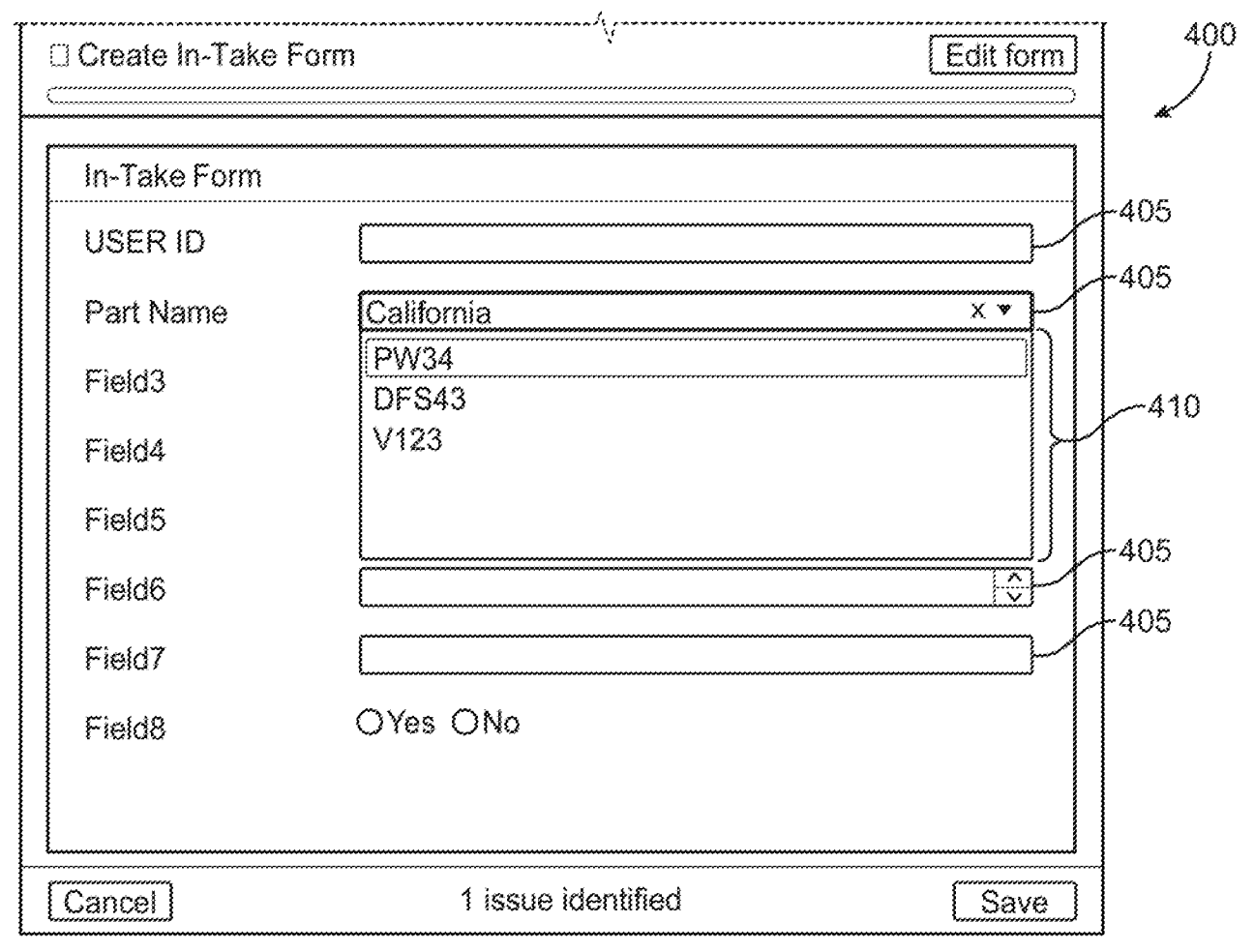

FIG. 4 depicts an exemplary dynamic electronic form 400 in accordance with various embodiments. Here, the dynamic electronic form includes multiple data entry fields 405 for the user or customer to input the necessary requested information. By way of example, some of the data entry fields 405 may request a text string of one or more letters, numbers, words, and/or other input, such as a selection button to input the data or information.

In some embodiments, the dynamic electronic form 400 may be able to capture and identify the user's input into the data entry field. For example, FIG. 4 depicts a string of words that a user has begun to input into one of the data entry fields 405. Here, one of the data entry fields 405 is requesting the name of a particular part. In the instance that the user does not know the part name, the user may type other information that is associated with the part name that is provided and identified in the data store 108.

By referring back to FIG. 3, the table 300 associated with parts information shows that a part name "PW34" is sourced from a factory located in "CALIFORNIA" with its replacement part "XP4." Specific tables 300 and or select datasets from the data store 108 may be integrated with select dynamic electronic forms 400. The relationship component 208 may be configured to determine that the correlation of information of the rows 310$n$ and columns 305$n$ with specific data entry fields.

Thus referring back to FIG. 4, when a user inputs the "PART NAME" information in the data entry field requesting for the part name, the database search component 206 may be able to recognize that the provided information "CALIFORNIA" does not match any of the identified part names provided in the data store 108 as reflected in the table in FIG. 3. However, the relationship component 208 may determine and recognize that the user has input the location of the factory producing the provided part name, which is found in table 300. Thus, the relationship component 208 may be configured to search across one or more databases or those that have been integrated with the electronic form in order to identify all dataset entries that contain a relationship or correlation with the information provided in the data input entry. The relationship component 208 may determine a strength in correlation with the information or data provided in the data entry field and whether it shares any similar properties, describes the same subject, and/or are otherwise related to any datasets in the data store 108. Thus, in this particular example, the recommendation component 210 may recommend part names in a pull down window 410 of the various part names associated with those parts sourced in the California based factory. The user may then select the suggested part names provided in the pull down window 410.

FIG. 5A depicts an exemplary dynamic electronic form 500 in accordance with various embodiments. In some embodiments, the dynamic electronic form 500 may provide the user with one or more selections for each of the data entry fields 505. In this particular example, the data entry field 505 requesting for "PRIMARY ITEM" information includes a pull down window 510 with a few options for selection. Here, there are two selection choices based on the data already provided in the prior data entry fields: a chair and a table. By way of example, the relationship component 208 may determine that the correlation of information such that when part name "PW34" is selected with a problem of "SUPPLY ISSUE," the primary items are limited to a "CHAIR" and "TABLE" based on the provided datasets integrated with the dynamic electronic form 500. As such, the relationship component 208 may be able to review the related data in the data store 108 and identify select data entries in the data entry fields 505. The recommendation component 210 may then be implemented to display the related data on the dynamic electronic form 500, such as in a pull down window 510.

Figure 5B:
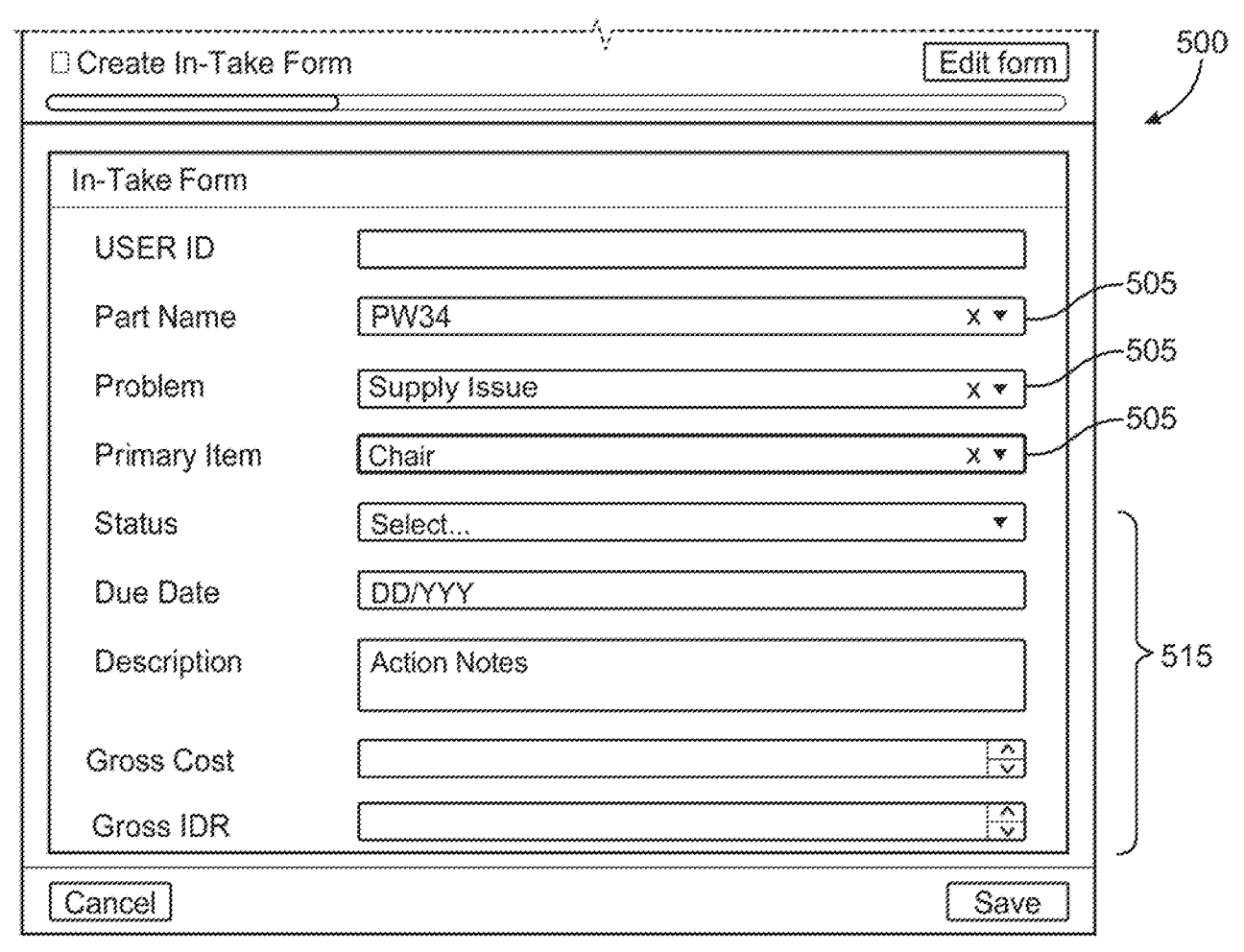

FIG. 5B depicts an exemplary dynamic electronic form 500 that changes in subsequent data entry fields in response to information provided or selected in the data entry fields 505 above. By referring back to FIG. 5A, when the user selects "CHAIR" from the pull down window 510 associated with the request for inputting "PRIMARY ITEM" information, this may result in the dynamic electronic form 500 changes. For example, the dynamic electronic form 500 may change such that any subsequent data entry fields 515 after "PRIMARY ITEM" has changed. Indeed, the form creation component 204 may be configured to implement "if-then" data entry fields so that if a certain value or data is input in one data entry field, then subsequent data entry fields are changed. Thus, the electronic forms are dynamic and responsive to the value or data input into the data entry fields.

Figure 6:
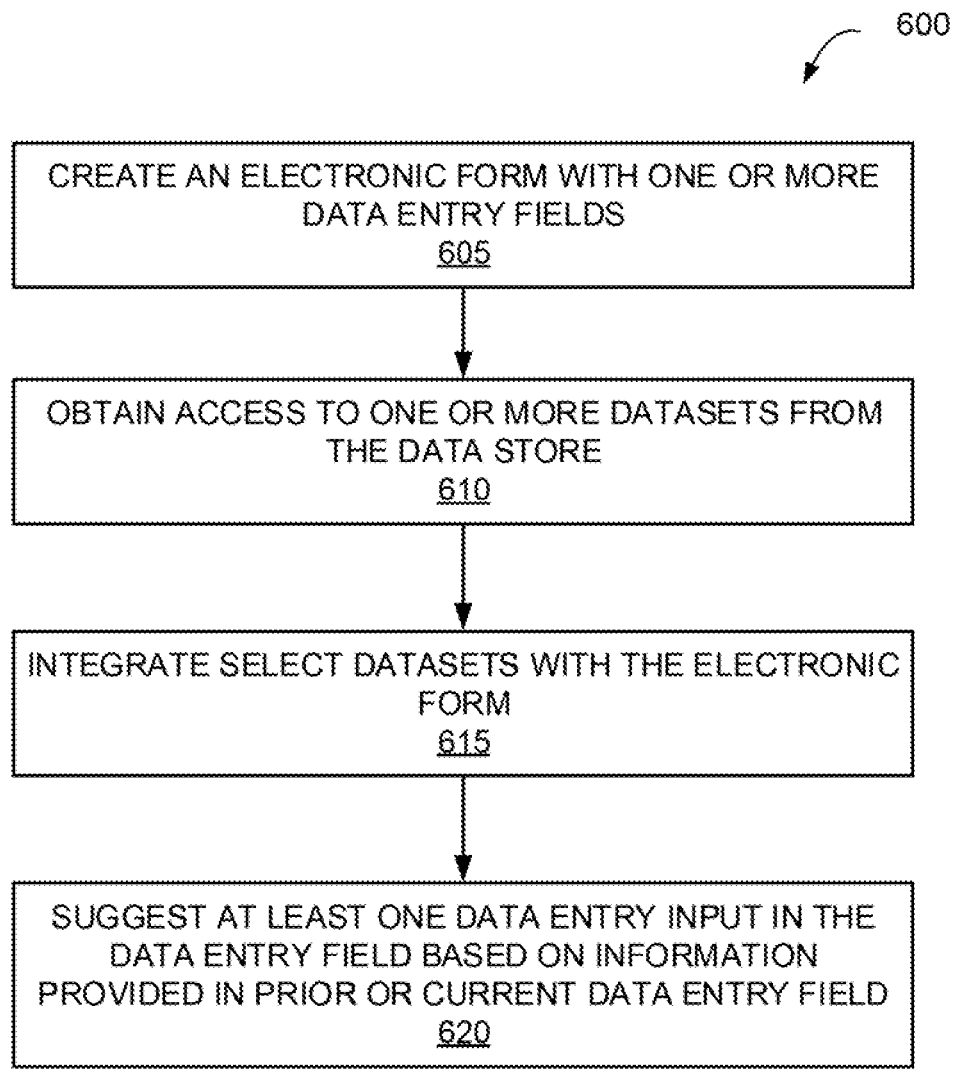
FIG. 6 is a flowchart of an example of a method for creating a dynamic electronic form.

FIG. 6 is a flowchart of an example of a method 600 for creating an electronic form. The method 600 may include step 605, where an electronic form may be created to include one or more data entry fields. Thus, a user may create any electronic form requesting to obtain any sort of information from users and customers. Thus, the user may select the types of questions or information to be requested from the users or persons to be filling out the form. The user may select the exact phrases or questions that are to be displayed on the electronic form next to each data entry field that collects the data input. Additionally, the user to design the visual features of the electronic form and how it is to be displayed on the user interface. For instance, the form creation component 204 may allow the user to choose the font style (e.g., font type, font size, font color, bold/underline/italic options, and the like), background color, location placement of the data entry fields, placement of borders, etc.

Additionally, the electronic form may be configured to create one or more dynamic forms such that the electronic form changes its unanswered data entry fields based on the user's data input in prior data entry fields. This may be achieved by implementing "if-then" data entry fields so that if a certain value or data is input in one data entry field, then subsequent data entry fields are changed. Thus, the electronic forms are dynamic and responsive to the value or data input into the data entry fields. The electronic form system may be performed by one or more servers, workstations, desktop computers, laptop computers, mobile devices, and/or other computing devices.

Next at step 610, the created electronic form from the dynamic electronic form system 200 may obtains access to one or more datasets located in the data store 108. Each of the datasets may include multiple data entry fields. More specifically, in some instances, at step 615, select or specific datasets may be integrated to the electronic form. Furthermore, select or specific datasets may be integrated to specific data entry fields of the electronic form. By doing so, this may enable the electronic forms to import select data from the integrated datasets utilizing the database search component.

Next, at step 620, the dynamic electronic form system 200 may be configured to suggest at least one data entry input in the data entry field based on the information provided in the prior or current data entry field. The relationship component 208, which may be configured to determine a strength in correlation with the information or data provided in the data entry field and whether it shares any similar properties, describes the same subject, and/or are otherwise related to any datasets in the data store 108. The relationship component 208 may be configured to predict associations between the information or data provided in the data entry field with any one or more data entries in the datasets and/or databases.

Figure 7:
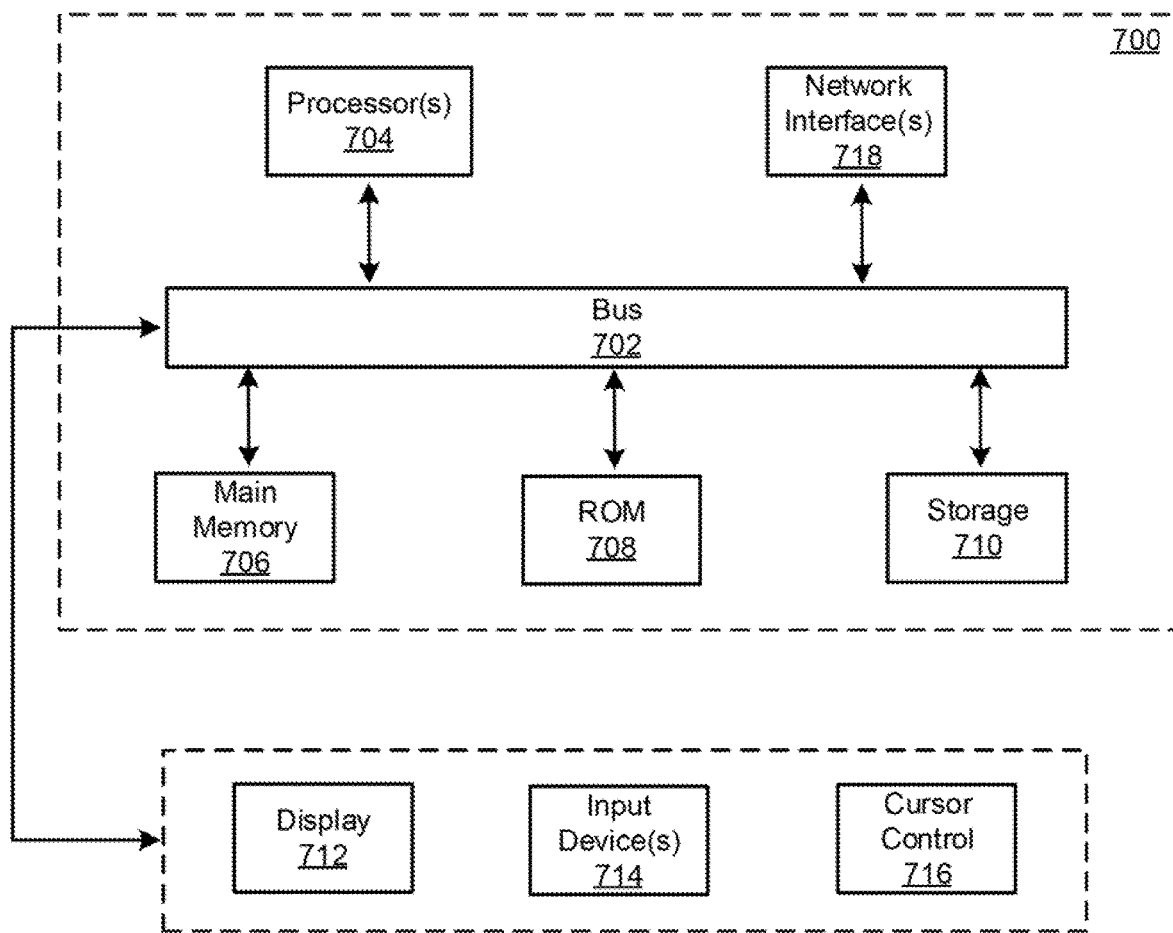
FIG. 7 depicts a block diagram of an example computer system upon which any of the embodiments described herein may be implemented.

FIG. 7 depicts a block diagram of an example of a computer system upon which any of the embodiments described herein may be implemented. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

In the instance that the relationship component 208 determines one or more data entries form the datasets in the data store 108 as potential choices for the data entry field, the results for the potential data entry inputs be recommended to the user or person. The recommendation component 210 may then display the results generated from the relationship component 210 onto the electronic form in the appropriate data entry field.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 602 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware.

Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A dynamic electronic form system comprising:
one or more processors; and
memory storing instructions that, when executed by the one or more processors, cause the system to perform:
creating an electronic form with a plurality of dynamic data entry fields;
obtaining access to a plurality of datasets, each dataset including multiple entry fields;
integrating at least one identified dataset with the electronic form; and
suggesting at least one data entry input in a particular dynamic data entry field of the plurality of dynamic data entry fields based on information input in another dynamic data entry field of the plurality of dynamic data entry fields by a user, the suggesting comprising:

determining a relationship between information input in the another dynamic data entry field by the user and the entry fields in the dataset integrated to the electronic form, the determining the relationship between information input in the another dynamic data entry field by the user and the corresponding dataset integrated to the electronic form comprising identifying correlation of information among rows and columns in the dataset integrated to the electronic form;

associating the correlation of information with the particular dynamic data entry field;

wherein the at least one data entry input suggested is sourced from the identified dataset integrated to the electronic form.

2. The dynamic electronic form system of claim 1, wherein the electronic form is created implementing if-then structure to select dynamic data entry fields.

3. The dynamic electronic form system of claim 2, wherein the if-then structure causes a change in a hierarchy listing of a plurality of dynamic data entry fields in response to at least one data entry input in the dynamic data entry fields.

4. The dynamic electronic form system of claim 1, wherein the one or more processors cause the system to perform import at least one data item listed in the entry field of the dataset to the corresponding dynamic data entry field.

5. The dynamic electronic form system of claim 1, wherein the one or more processors cause the system to notify incorrect data input by the user in the particular dynamic data entry field when the data input is not located in the dataset integrated to the electronic form.

6. The dynamic electronic form system of claim 1, wherein the one or more processors cause the system to display the suggested data entry input in a pull-down window in the particular dynamic data entry field.

7. A method for creating a dynamic electronic form, comprising:

creating an electronic form with a plurality of dynamic data entry fields;

obtaining access to a plurality of datasets, each dataset including multiple entry fields;

integrating at least one identified dataset with the electronic form; and suggesting at least one data entry input in a particular dynamic data entry field of the plurality of dynamic data entry fields based on information input in another dynamic data entry field of the plurality of dynamic data entry fields by a user, the suggesting comprising:

determining a relationship between information input in the another dynamic data entry field by the user and the entry fields in the dataset integrated to the electronic form, the determining the relationship between information input in the another dynamic data entry field by the user and the corresponding dataset integrated to the electronic form comprising identifying correlation of information among rows and columns in the dataset integrated to the electronic form;

associating the correlation of information with the particular dynamic data entry field;

wherein the at least one data entry input suggested is sourced from the identified dataset integrated to the electronic form.

8. The method of claim 7, wherein creating an electronic form with one or more data entry fields comprises implementing if-then structure to select dynamic data entry fields.

9. The method of claim 8, wherein the if-then structure causes a change in a hierarchy listing of a plurality of dynamic data entry fields in response to at least one data entry input in the dynamic data entry fields.

10. The method of claim 9, further comprising importing at least one data item listed in the entry field of the dataset to the corresponding dynamic data entry field.

11. The method of claim 7, further comprising notifying an incorrect data input by the user in the particular dynamic data entry field when the data input is not located in any one of the datasets integrated to the electronic form.

12. The method of claim 7, further comprising displaying the suggested data entry input in a pull-down window in the particular dynamic data entry field.

13. A non-transitory computer-readable memory storing instructions that, when executed by one or more processors, cause the one or more processors to perform:

creating an electronic form with a plurality of dynamic data entry fields;

obtaining access to a plurality of datasets, each dataset including multiple entry fields;

integrating at least one identified dataset with the electronic form; and suggesting at least one data entry input in a particular dynamic data entry field of the plurality of dynamic data entry fields based on information input in another dynamic data entry field of the plurality of dynamic data entry fields by a user, the suggesting comprising:

determining a relationship between information input in the another dynamic data entry field by the user and the entry fields in the dataset integrated to the electronic form, the determining the relationship between information input in the another dynamic data entry field by the user and the corresponding dataset integrated to the electronic form comprising identifying correlation of information among rows and columns in the dataset integrated to the electronic form;

associating the correlation of information with the particular dynamic data entry field;

wherein the at least one data entry input suggested is sourced from the identified dataset integrated to the electronic form.

14. The non-transitory computer-readable memory of claim 13, wherein the instructions further cause the system to perform creating an electronic form with one or more data entry fields comprises implementing if-then structure to select dynamic data entry fields.

15. The non-transitory computer-readable memory of claim 14, wherein the if-then structure causes a change in a hierarchy listing of a plurality of data entry fields in response to at least one data entry input in the dynamic data entry fields.

16. The non-transitory computer-readable memory of claim 15, wherein the instructions further cause the system to perform importing at least one data item listed in the entry field of the dataset to the corresponding dynamic data entry field.

* * * * *